Dec. 30, 1941.  W. J. NEISINGH  2,268,055
DISK GANG
Filed March 30, 1940   2 Sheets-Sheet 1

INVENTOR
W. J. Neisingh
BY
ATTORNEYS

Dec. 30, 1941.                    W. J. NEISINGH                    2,268,055
                                    DISK GANG
                              Filed March 30, 1940                2 Sheets-Sheet 2
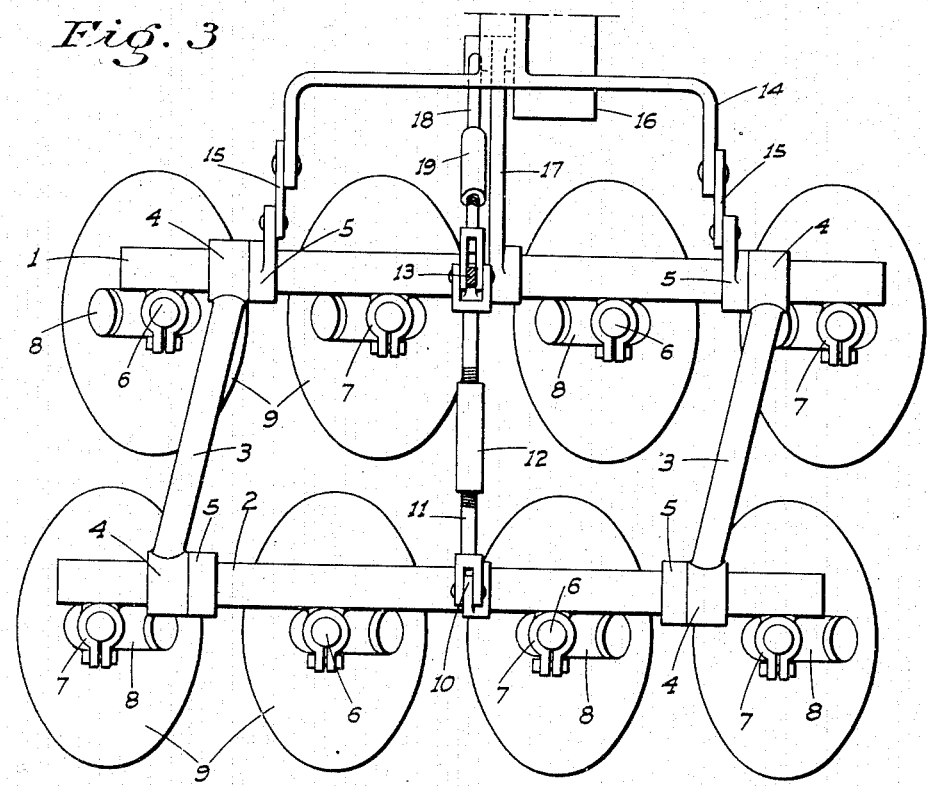
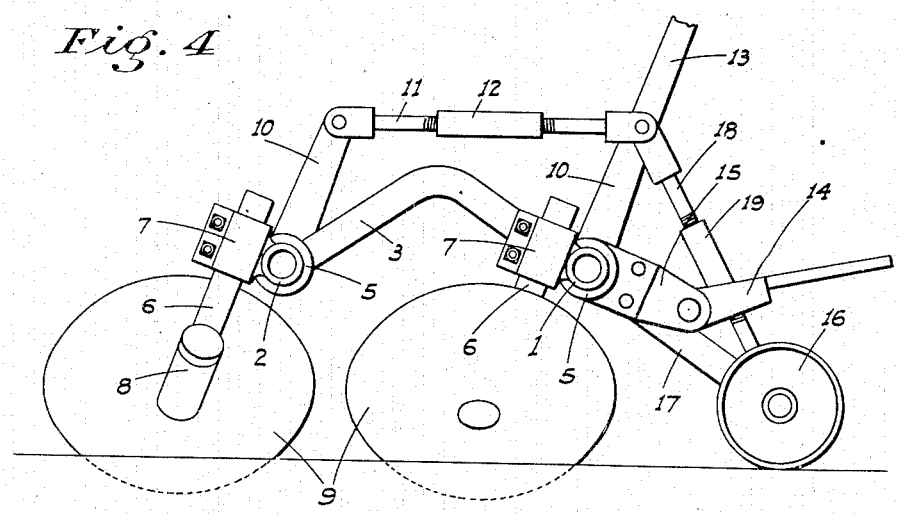
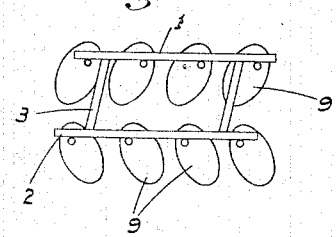
INVENTOR
W. J. Neisingh
BY
Webster & Webster
ATTORNEYS Patented Dec. 30, 1941

2,268,055

UNITED STATES PATENT OFFICE 2,268,055

DISK GANG

Walter J. Neisingh, Hanford, Calif.

Application March 30, 1940, Serial No. 326,827

14 Claims. (Cl. 55—73)

This invention relates to disk plows, either of the concave or coulter disk type, and one capable of being arranged as a single, front and rear, or tandem gang plow.

The principal objects of my invention are to provide a plow having offset disks which are arranged so as to be self penetrating, without relying on weight or any particular type of disk blade for penetration; one having means to mechanically or manually control the degree of penetration, one which will operate under a given condition with less drawbar pull than a plow of conventional form, and one which is extremely compact and so capable of making short turns and of being easily picked up for transportation by a tractor equipped for such an operation.

Also, the disks are arranged so that while being all mounted on a single compact frame, they may be simultaneously adjusted for right, straight ahead or left hand steering, thus greatly lessening the drag on the tractor when making sharp turns. The plow is thus admirably adapted for orchard or vineyard work where such turns are frequent.

Further, the disks are so mounted as to produce an undercutting and shearing effect, and to have a turn-over action on the soil, which is desirable in cover crop cultivation and in weed and stalk cutting where a shearing action is desirable and important.

A further object is to mount the disks for individual adjustment so that the axes of the disks in a direction lengthwise of the plow may be set at different angles to the line of travel independently of the angle thereof assumed when set in plowing position.

Still another object is to provide an automatically functioning and adjustable means to control the depth of penetration of the discs and to cause them to pull of themselves out of the ground when approaching a check levee or the like so that the danger of the plow cutting into the levee is eliminated.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is a top plan view of the plow.

Figure 4 is a side view showing the disks in normal digging or penetrating position.

Figures 5 and 6 are diagrammatic plans showing the disks as set for right and left hand steering respectively.

Figure 1:
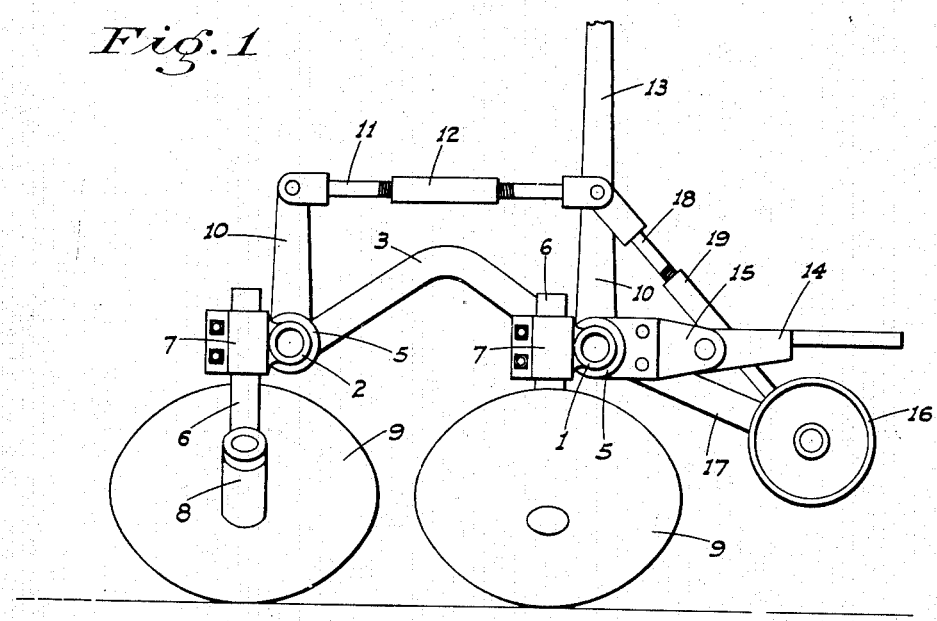
Figure 1 is a side view of a two-gang plow showing the disk set for straight steering and non-penetration.
Figure 2:
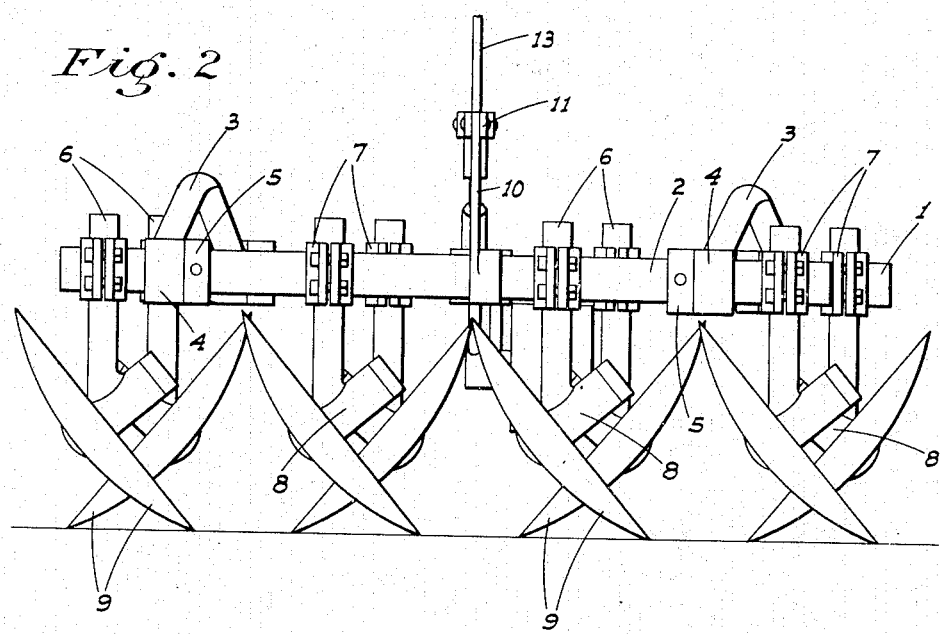
Figure 2 is a rear end view of the plow with the disks similarly set.

Referring now more particularly to the characters of reference on the drawings, the two gang plow as here shown comprises front and rear circular and preferably tubular beams 1 and 2 respectively which form the head frames. These beams are tied together in transversely offset but parallel relationship by arched connection members 3 in the end sleeves 4 of which the beams are turnable and slidable. The beams are normally held against sliding movement in the sleeves, and maintained in any desired offset relation to each other by set collars 5 on the beams engaging the sleeves.

Depending from behind the beams in evenly spaced relation along the same are standards 6 individually turnable but normally held from rotation in clamping sleeves 7 fixed on the beams. The standards and brackets are vertical in the longitudinal plane of the plow. Supporting members 8 for the spindles 9 of the plow disks are fixed in the lower end of the standards in such position that the arcs of the spindles, and consequently the disks, are disposed at an acute angle to a horizontal plane when the disks are in an idle or any working positions. Such angle, when the standards are vertically disposed both lengthwise and transversely of the plow, is preferably less than 45° to the vertical. It will of course be understood that the standards on the front and rear beams 1 and 2 are transversely offset from each other, and that the corresponding disks are disposed in oppositely facing relation, as shown.

In order to turn the beams 1 and 2 simultaneously and thus adjust the angular settings of the disks relative to the ground and to the direction of travel of the plow, I provide arms 10 upstanding from and rigid with the beams intermediate their ends, which are connected by a rigid link 11. This link includes an adjustable turn buckle 12 or similar means to alter the effective length of the link. The forward arm 10 extends some distance above the link in the form of a lever 13 adapted for manual manipulation, or to be connected to a mechanical or power control means, as the type of tractor to which the plow is attached may render feasible.

A yoke 14, adapted for connection to the drawbar of such tractor, is swivelly connected to the front beam 1 as by ears 15 on and projecting forwardly from the collars 5 on said beam. These ears are disposed at right angles to the adjacent standards 6, as shown in Fig. 1.

A gage wheel 16 is disposed ahead of the front gang, and is connected to the front beam 1 by a radius bar 17 turnable on said beam. The wheel is also connected to front arm 10 by a link 18 which includes a turn buckle 19 or similar device to alter the effective length of the link.

The normal or inoperative and ground level riding position of the disks is when the standards are vertically disposed in planes transversely of the plow, and with the spindle bearing members extending at right angles to the line of travel. The disks are then obviously disposed with their horizontal axial lines parallel to the line of travel, and with their opposite axial lines at the greatest angle to the ground, as shown in Figs. 1 to 4. In this position, the disks will not enter the ground if the lever is held and the implement will obviously steer straight ahead. The gage wheel is then some distance above the ground, and the arms 10 are preferably perpendicular as shown in Fig. 1.

When it is desired to set the disks for plowing, the lever 13 is released. The ground pressure against the disks then turns both beams 1 and 2 so that the standards 6 become disposed at an acute angle to vertical transverse planes. The bearing members also become canted so that their angle relative to the ground is reduced, and is also shifted to an acute angle to the line of travel from the position originally occupied. As a result, the disks on the front gang are swung toward the right, and the disks on the left gang are swung toward the left, as indicated in Fig. 5. The plow therefore tends to steer toward the right and, the disks being turned toward a vertical position, penetrate the ground of themselves.

The degree of penetration depends upon the extent of movement of the disks toward such vertical position, which is limited and automatically controlled by the use of the gauge wheel; assuming that when so used, the lever control means is left slack. This is because the wheel, being tied to the front arm 10, is raised and lowered by the swinging of said arm. When the arm 10 is pulled forwardly, the wheel is lowered so that as the disks enter the ground, the wheel finally rides on the ground. Further depth of penetration is thus prevented, since the wheel cannot go any lower.

The actual depth of penetration is determined by the vertical distance between the lower edges of the disks and the bottom of the wheel, which may be altered to suit by adjusting the length of the tie link 18. This gage wheel besides functioning to govern extent of penetration, is also a safeguard against the possibility of check levees and the like being cut into. This is because the wheel will engage the abruptly rising levee ahead of the disks and will ride up the levee, immediately swinging the arm 10 back and returning the disks to their inoperative position, thus causing them to draw out of the ground of themselves.

If the lever 13 is swung to the rear from its inoperative position, the angular setting of the disks of the gangs relative to each other is reversed from the setting had with a pull on the lever, and the front disks are swung to the left and the rear disks to the right as indicated in Fig. 6. The plow will thus tend to steer toward the left. As a result of the ease and quickness with which the disks may be shifted to any position, and to the compactness of the plow as a whole, plowing in close quarters, such as vineyards and orchards, is greatly facilitated, placing less strain both on the tractor and on the operator than is the case with ordinary equipment.

By reason of the adjustable link 11, the angular relation of the standards of the two gangs (and consequently the corresponding disks) may be readily altered if desired to offset the naturally greater working pull of the front gang.

By reason of the use of the adjustable collars 5, the offset relationship of the head frames of the two gangs, and the disks carried thereby, may be altered to suit different conditions.

By reason of the rotative adjustability of the standards in their bearing sleeves, any or all disks may be set at different angles relative to each other as operating conditions or the results to be obtained may render desirable. For instance, adjacent discs may be set relative to each other for ridging purposes.

By uncoupling the link 11, the two gangs may be folded into very compact relationship with each other without removing any disks, thus making for ease of shipment or loading onto a truck bed or the like for transportation, the compactness being of course aided by the parallel head frames. Since the beams 1 are connected by a parallel linkage arrangement comprising connection members 3, arms 10 and link 11, one beam, and its disks, may raise or lower relative to the other without altering the angle of the corresponding standards 6 to the perpendicular and the angle of the disks relative to the ground, so that the front and rear gangs are free to automatically conform to ground undulations and maintain themselves always in the same position relative to the ground at which they were initially set.

Also it will be seen that since the set collars 5 are of course normally fixed against movement and rotation on the beam 1, the ears 15 assume a forward and downward slant when the disks are set for penetration and the standards 6 are disposed with a rearward slope to their lower end. Therefore when the draft tractor climbs a ridge for instance, which it is not desired to cut, the drawbar at the tractor end becomes raised, and exerts in upward pull on the downwardly sloping ears 15 as will be obvious. This exerts a rotative action on the front beam 1, tending to turn the same in a direction to restore standards 6 to a vertical position and thus withdrawing the disks from the ground ahead of the ridge, even though the gauge wheel is not used. This will allow the disks to pass over the ridge without penetration thereof.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A disk plow comprising a head frame, means supporting the frame for rotation, standards fixed on and depending from the frame, disks transversely offset and supported from the standards and shifting, with rotation of the frame in one direction from a predetermined position, from a non-operating to an operating position, control means applied to the frame to rotate the same in said one direction to dispose the disks in operative position, a gage wheel and means connecting the wheel and control means so that with upward movement of the wheel from a predetermined level, the frame is rotated in an opposite direction to cause the disks to be shifted from an operative toward an inoperative position.

2. A disk plow comprising a head frame, means supporting the frame for rotation, standards fixed on and depending from the frame, disks transversely offset and supported from the standards and shifting, with rotation of the frame in one direction from a predetermined position, from a non-operating to an operating position, control means applied to the frame to rotate the same in said one direction to dispose the standards at a downward slope to the rear to alter the angular relationship of the disks to the ground and cause the same to enter the ground, said means including an upstanding arm, a gage wheel adapted to ride the ground ahead of the disks when the disks are in the ground, a radius rod between the wheel and frame and a rigid connection between the wheel and arm.

3. A structure as in claim 2 in which said connection is adjustable as to length whereby to alter the vertical distance between the bottom of the wheel and the plane of the lower edge of the disks.

4. An offset two gang disk plow comprising front and rear gang frame beams, rigid members extending between and connecting the beams in parallel relationship and having end elements turnably supporting the beams, standards fixed on and depending from the beams, disks transversely offset from the standards, means supporting the disks from the standards so that the axes of the disks are disposed at an acute angle to the ground in opposite order on the two gangs and control means applied to the beams to simultaneously turn them in the same direction.

5. A structure as in claim 4, with means included in said control means to turn one beam relative to the other while maintaining them connected for simultaneous turning.

6. A disk plow comprising front and rear head frames, a plurality of disks supported from each frame, the disks of the two frames being disposed in transversely offset and opposed relation to each other, means mounting the frames in connection with each other for relative longitudinal shifting movement while maintaining them parallel and means to hold the frames in any shifted position.

7. A disk plow comprising front and rear head frames, a plurality of disks supported from each frame, the disks of the two frames being disposed in transversely offset and opposed relation to each other, rigid connecting means extending between the frames and including transversely spaced sleeves in which the frames are slidable and set collars engaging the sleeves and adjustable along the frames.

8. A disk plow comprising front and rear head frames, means connecting the frames as a unit and for rotation, standards fixed on and depending from the frames, disks transversely offset and supported from the standards, the disks of the two frames being disposed in opposed and offset relation to each other, and the disks of both frames being disposed, when in inoperative position, with their axes all at an acute angle to the ground in a transverse plane and all at right angles to the line of travel of the plow; and means to rotate the frames in the same direction.

9. A disk plow comprising front and rear head frames, rigid means connecting the frames as a unit and for rotation, standards depending from the frames, disks mounted on the standards at their lower end, arms of the same length fixed on and radiating from the frames, a link connecting the arms, means applied to one frame to rotate the same, and draft means swivelly and directly connected to the front frame.

10. A disk plow comprising front and rear head frames, rigid means connecting the frames as a unit and for rotation, standards depending from the frames, disks mounted on the standards at their lower end, arms of the same length fixed on and radiating from the frames, means applied to one frame to rotate the same and a link unit connecting the arms, said unit including separate members, and means adjustably tying said members together.

11. A disk plow comprising front and rear head frames, means connecting the frames as a unit and for rotation, standards fixed on and depending from the frames, disks transversely offset and supported from the standards, the disks of the two frames being disposed in opposed and offset relation to each other, and the disks of both frames being disposed, when in inoperative position, with their axes all at an acute angle to the ground in a transverse plane and all at right angles to the line of travel of the plow; means to rotate the frames simultaneously in one direction and so that the standards at their lower end are shifted rearwardly, ears rigid with and projecting forwardly from the front frame, said ears being substantially horizontal when the disks are in an inoperative position and a draft element pivoted on the ears at their forward end.

12. A disk plow including a head frame, means mounting the frame for rotation, standards depending from the frame, disks supported from the standards and disposed when inoperative so that their axes are at an acute angle to the ground in a transverse plane and at right angles to the line of travel, means to rotate the frame in a direction such that the standards at their lower ends are shifted rearwardly, and draft means applied to the frame at a point such that the draft pull tends to rotate the frame in the opposite direction.

13. A disk plow including a head frame, means mounting the frame for rotation, standards depending from the frame, disks supported from the standards and disposed when inoperative so that their axes are at an acute angle to the ground in a transverse plane and at right angles to the line of travel, means to rotate the frame in a direction such that the standards at their lower ends are shifted rearwardly, ears rigid with and projecting forwardly from the frame, said ears being substantially horizontal when the disks are in an inoperative position and a draft element connected to the ears at their forward end.

14. A disk plow comprising front and rear head frames, rigid members connecting the frames as a unit and for rotation, standards depending from the frames, disks mounted on the standards at their lower end, draft means swivelly and directly applied to the front frame whereby the frames may move vertically relative to each other to conform to ground undulations, and means connecting the frames to maintain the standards at the same angle to the perpendicular irrespective of the relative level of the frames.

WALTER J. NEISINGH.